United States Patent [19]

Jöllenbeck et al.

[11] Patent Number: 5,009,669
[45] Date of Patent: Apr. 23, 1991

[54] AQUEOUS DISPENSIONS OF 2-(2'-HYDROXYPHENYL)BENZO-TRIAZOLES

[75] Inventors: Martin Jöllenbeck, Freiburg, Fed. Rep. of Germany; Hans-Ulrich Berendt, Allschwil; Werner Fringeli, Laufen, both of Switzerland

[73] Assignee: Ciba-Geigy Corporation, Ardsley, N.Y.

[21] Appl. No.: 358,910

[22] Filed: May 30, 1989

[30] Foreign Application Priority Data

May 31, 1988 [CH] Switzerland .......................... 2056/88
Aug. 5, 1988 [CH] Switzerland .......................... 2981/88

[51] Int. Cl.$^5$ .......................... C09B 67/00; C09B 67/46
[52] U.S. Cl. .......................... 8/573; 8/527; 8/589; 8/648; 8/900
[58] Field of Search .................. 8/573, 900, 922, 527; 252/34; 548/258

[56] References Cited

U.S. PATENT DOCUMENTS

| | | | |
|---|---|---|---|
| 3,097,047 | 7/1963 | Weinstein et al. | 8/900 |
| 3,787,181 | 1/1974 | Dellian et al. | 8/922 |
| 3,957,434 | 5/1976 | Dellian et al. | 8/922 |
| 3,977,828 | 8/1976 | Becker et al. | 8/529 |
| 4,000,969 | 6/1977 | Dellian et al. | 8/922 |
| 4,042,320 | 7/1977 | Becker et al. | 8/524 |
| 4,094,634 | 6/1978 | Becker et al. | 8/527 |
| 4,270,917 | 6/1981 | Heald et al. | 8/527 |
| 4,853,140 | 8/1989 | Payne et al. | 252/34 |

FOREIGN PATENT DOCUMENTS

| | | | |
|---|---|---|---|
| 0252824 | 1/1988 | European Pat. Off. | |
| 2453146 | 5/1976 | Fed. Rep. of Germany | |
| 2606906 | 8/1977 | Fed. Rep. of Germany | 8/922 |
| 106813 | 3/1981 | Japan | |
| 159945 | 12/1981 | Japan | |
| 8136885 | 8/1983 | Japan | 8/573 |
| 2187746 | 9/1987 | United Kingdom | 8/573 |

OTHER PUBLICATIONS

Chem. Abst. 102, 168259q.
Chem. Abst. 99, 196968h.
Chem. Abst. 95, 205338z.

*Primary Examiner*—Paul Lieberman
*Assistant Examiner*—J. E. Darland
*Attorney, Agent, or Firm*—George R. Dohmann; Edward McC. Roberts

[57] ABSTRACT

Aqueous stable dispersion of UV-absorbing 2-(2'-hydroxyphenyl)benzotriazole compounds containing
(a) 15 to 50 per cent by weight of a benzotriazole compound of the formula

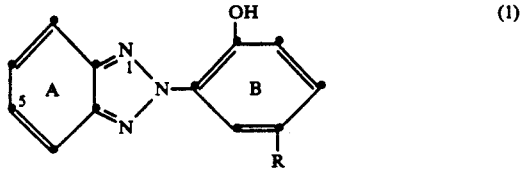

where R is halogen, $C_1$–$C_{12}$alkyl, lower alkoxy, lower alkoxycarbonyl, cycloalkyl, aryl, $C_1$–$C_{12}$alkylaryl or aralkyl, and the rings A and B can be further substituted independently of one another by halogen, hydroxyl, lower alkyl, lower alkoxy or lower alkoxycarbonyl, and (b) 2 to 20 per cent by weight of an acid ester, or salt thereof, of an alkylene oxide adduct of the formula

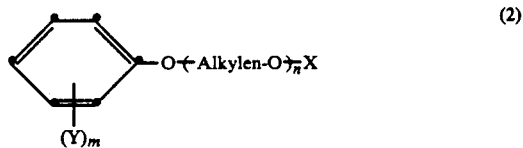

where X is the acid radical of an inorganic oxygen-containing acid, or else the radical of an organic acid and Y is $C_1$–$C_{12}$alkyl, aryl or aralkyl, "Alkylen" is the ethylene radical or propylene radical, and m is from 1 to 4 and n from 4 to 50.

These dispersions are excellent agents for improving the light fastness of dyeings of synthetic fibres, in particular polyester fibres or acid-modified polyester fibres.

25 Claims, No Drawings

AQUEOUS DISPENSIONS OF 2-(2'-HYDROXYPHENYL)BENZOTRIAZOLES

The present invention relates to an aqueous dispersion of 2-(2'-hydroxyphenyl)benzotriazoles useful as UV absorbers and the use thereof in the dyeing of synthetic fibres, in particular polyester fibres or acid-modified polyester fibres.

The dispersion according to the invention contains (a) 15 to 50 per cent by weight of a benzotriazole compound of the formula

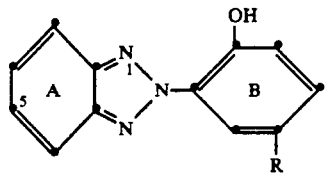
(1)

where R is halogen, $C_1$–$C_{12}$alkyl, lower alkoxy, lower alkoxycarbonyl, cycloalkyl, aryl, $C_1$–$C_{12}$alkylaryl or aralkyl, and the rings A and B can be further substituted independently of one another by halogen, hydroxyl, lower alkyl, lower alkoxy or lower alkoxycarbonyl, and (b) 2 to 20 per cent by weight of an acid ester, or a salt thereof, of an alkylene oxide adduct of the formula

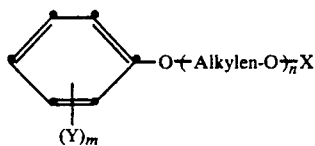
(2)

where X is the acid radical of an inorganic oxygen-containing acid, for example sulfuric acid or preferably phosphoric acid, or the radical of an organic acid and Y is $C_1$–$C_{12}$alkyl, aryl or aralkyl, "Alkylen" is the ethylene radical or propylene radical, m is from 1 to 4, and n is from 4 to 50.

Advantageously, the aqueous dispersion according to the invention contains 20 to 40 per cent by weight of component (a) and 2 to 15 per cent by weight, preferably 2 to 10 per cent by weight of component (b). Component (a) advantageously has a particle size below 5 μm.

Not only component (a) but also component (b) can be present as individual compound or in the form of a mixture.

In the definition of the radicals of the compounds of the formulae (1) and (2), lower alkyl and lower alkoxy are alkyl and alkoxy groups or group constituents of 1 to 5, in particular 1 to 3, carbon atoms. Examples of such groups are methyl, ethyl, n-propyl, isopropyl, n-butyl isobutyl, sec-butyl, tert-butyl, amyl, isoamyl, and tert-amyl on the one hand and methoxy, ethoxy, isopropoxy, isobutoxy and tert-butoxy on the other.

Halogen is for example fluorine, bromine or preferably chlorine.

Alkyls R in the formula (1) and Y in the formula (2) can be straight-chain or branched. Examples of such alkyl radicals are methyl, ethyl, n-propyl, isopropyl, n-butyl, isobutyl, sec-butyl, tert-butyl, amyl, isoamyl, tert-amyl, n-hexyl, 2-ethylhexyl, n-heptyl, n-octyl, iso-octyl, n-nonyl, isononyl and n-dodecyl.

Examples of cycloalkyl R are cyclopentyl, cycloheptyl and preferably cyclohexyl. The cycloalkyl radicals can contain one or more $C_1$–$C_4$alkyl radicals, preferably methyl groups, and have a total of 5 to 10 carbon atoms.

Aryls R in the formula (1) and Y in the formula (2) are advantageously phenyl. The phenyl radical can be monosubstituted or disubstituted by halogen, lower alkyl, such as methyl, or lower alkoxy, such as methoxy.

An alkylaryl R is advantageously alkylphenyl where the alkyl radical is preferably in the para-position. The alkyl radicals in the alkylphenyl can be methyl, ethyl, isopropyl, butyl, hexyl, n-octyl, tert-octyl, n-nonyl, isononyl, decyl and dodecyl.

Aralkyls R and Y advantageously have a total of 7 to 9 carbon atoms and are in general benzyl, α-methylbenzyl, α,α-dimethylbenzyl, β-phenethyl, α-tolylethyl and phenisopropyl.

The substituent R in formula (1) is preferably lower alkyl. The substituent Y in formula (2) is advantageously $C_4$–$C_{12}$alkyl, benzyl, preferably $C_4$–$C_{10}$alkyl, or in particular α-methylbenzyl.

The ring A is preferably substituted in the 5-position by halogen, lower alkyl or lower alkoxy. Advantageously, the ring A has a further substituent, for example halogen or methyl, in the 6-position.

The benzene ring B is likewise preferably further substituted by for example lower alkyl or halogen in the position adjacent to the hydroxyl group.

n is preferably from 8 to 30, while m is preferably from 1 to 3.

$(Alkylen-O)_n—$ chains are preferably of the ethylene glycol, propyleneethylene glycol or ethylenepropylene glycol type, particularly preferably of the ethylene glycol type.

The acid radical X is derived for example from low molecular weight dicarboxylic acids, for example maleic acid, succinic acid or sulfosuccinic acid, and is bonded with an ester bridge to the alkyleneoxy moiety of the molecule. Preferably, however, X is derived from inorganic polybasic acid such as sulfuric acid or in particular orthophosphoric acid.

The acid radical X can be present as free acid or in salt form, i.e. for example as alkali or alkaline earth metal, ammonium or amine salt. Examples of such salts are lithium, sodium, potassium, magnesium, calcium, barium, ammonium, trimethylamine, diethylamine, ethanolamine, diethanolamine and triethanolamine salts. Preference is given to alkali metal salts and in particular triethanolamine salts. The mono- and diethanolamine salts can additionally be etherified with 1 to 25 ethyleneoxy units.

Important practical components (a) conform to the formula

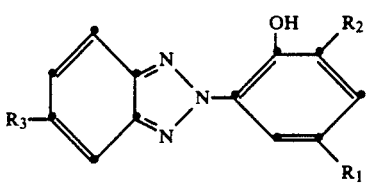
(3)

where $R_1$ is halogen, lower alkyl or lower alkoxy and $R_2$ and $R_3$ are each independently of the other, hydrogen, halogen, lower alkyl or lower alkoxy.

Of the benzotriazole compounds of the formula (3), those where $R_1$ is lower alkyl such as methyl or tert-butyl, $R_2$ is hydrogen or lower alkyl and $R_3$ is hydrogen, chlorine or methyl are preferred.

Interest is focused on 2-(2'-hydroxy-5'-methylphenyl)benzotriazole, 2-(2'-hydroxy-3',5'-dimethylphenyl)benzotriazole, 2-(2'-hydroxy-5-tertbutylphenyl) benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-5'-tert-octylphenyl)benzotriazole, 2-(2'-hydroxy-3',5'-di-tert-amylphenyl) benzotriazole and 2-(2'-hydroxy-3',5'-di-tert-butylphenyl)benzotriazole.

The known Uv-absorbing benzotriazole compounds of the formulae (1) and (3) are for the most part described in FR-A-1,195,307.

Preferred acid esters of component (b) conform to the formula

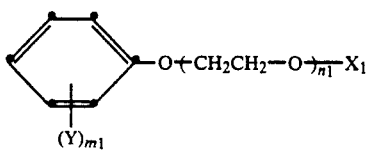

where $Y_1$ is $C_4$–$C_{12}$alkyl, phenyl, tolyl, tolyl-$C_1$–$C_3$alkyl or phenyl-$C_1$–$C_3$-alkyl, e.g. benzyl, α-methyl- or α,α-dimethylbenzyl, $X_1$ is an acid radical derived from sulfuric acid or preferably orthophosphoric acid, $m_1$ is from 1 to 3, and $n_1$ is from 4 to 40.

These acid esters are preferably present as sodium, potassium, ammonium, diethylamine, triethylamine, diethanolamine or triethanolamine salts.

The acid esters of the formula (2) or (4) suitable for use as component (b) are prepared by addition of alkylene oxide (ethylene oxide or propylene oxide) onto a substituted phenol compound of the type defined and conversion of the addition product with a polybasic oxygen acid or with a functional derivative of this acid, for example acid anhydrides, acid halides, acid esters or acid amides, into the acid esters and optionally conversion of the acid ester obtained into the abovementioned salts. Examples of these functional derivatives are phosphorus pentoxide, phosphoryl trichloride, chlorosulfonic acid and sulfamic acid. Both the alkylene oxide addition and the esterification can be carried out by known methods.

Highly suitable components (b) are acid esters, or salts thereof, of a polyadduct of 4 to 40 mol of ethylene oxide with 1 mol of a phenol having at least one $C_4$–$C_{12}$akyl group, phenyl group, tolyl group, α-tolylethyl group, benzyl group, α-methylbenzyl group or α,α-dimethylbenzyl group, for example butylphenol, tributylphenol, octylphenol, nonylphenol, dinonylphenol, o-phenylphenol, benzylphenol, dibenzylphenol, α-tolylethylphenol, dibenzyl(nonyl)phenol, α-methylbenzylphenol, bis(α-methylbenzyl)phenol or tris(α-methylbenzyl)phenol, these acid esters being usable alone or mixed.

Of particular interest are acid phosphoric esters of polyadducts of 8 to 30 mol, especially of 12 to 18 mol, of ethylene oxide with 1 mol of 4-nonylphenol or dinonylphenol or in particular with 1 mol of compounds prepared by addition of 1 to 3 mol of styrene with 1 mol of a phenol, the phosphoric esters being advantageously present as mixtures of the corresponding salts of a monoester and a diester.

The styrene addition products are prepared in a known manner, preferably in the presence of catalysts, such as sulfuric acid, p-toluenesulfonic acid or in particular zinc chloride. Suitable styrenes are advantageously styrene, α-methylstyrene and vinyltoluene (4-methylstyrene). Examples of phenols are phenol, cresols and xylenols.

Very particular preference is given to acid phosphoric esters (mono- and diesters), or salts thereof, of the polyadducts of the formula

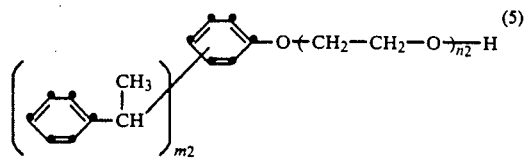

where $m_2$ is from 1 to 3 and $n_2$ is from 12 to 30, especially 12 to 20.

Specific examples of polyadducts of the formula (5) are:

the polyadduct of 18 mol of ethylene oxide and the adduct of 2 mol of styrene with 1 mol of phenol the polyadduct of 18 mol of ethylene oxide and the adduct of 3 mol of styrene with 1 mol of phenol the polyadduct of 27 mol of ethylene oxide and the adduct of 2 mol of 4-methylstyrene with 1 mol of phenol the polyadduct of 17 mol of ethylene oxide and the adduct of 3 mol of 4-methylstyrene with 1 mol of phenol the polyadduct of 18 mol of ethylene oxide and the mixture of the adduct of 2 mol of styrene with 1 mol of phenol and the adduct of 3 mol of styrene with 1 mol of phenol the polyadduct of 13 mol of ethylene oxide and the adduct of 3 mol of styrene with 1 mol of phenol.

Aside from components (a) and (b), the dispersion according to the invention advantageously contains in addition a stabilizing or thickening agent as component (c). Such an addition serves to adjust the viscosity of the dispersion.

Suitable components (c) are in particular carboxyl-containing polymers. These are used in the form of 0.5 to 10%, preferably 0.5 to 5%, aqueous solutions or dispersions, based on the solution or dispersion.

These polymers are advantageously polymerized ethylenically unsaturated mono- or dicarboxylic acids of 3 to 5 carbon atoms, for example polyacrylic acid or polymers of methacrylic acid, crotonic acid, itaconic acid, teraconic acid, maleic acid or the anhydride thereof, fumaric acid, citraconic acid or mesaconic acid, copolymers of olefins, for example ethylene or propylene, diketenes, acrylic esters, methacrylic esters or acrylamides and the aforementioned monomers, including acrylic acid or copolymers of acrylic acid with methacrylic acid, methacrylonitrile or vinyl monomers, for example vinylphosphonic acid, copolymers of maleic acid and styrene, maleic acid and a vinyl ether or maleic acid and a vinyl ester, for example vinyl acetate.

The thickening carboxyl-containing polymers can have a molecular weight of 0.5 to 6 million.

Particularly useful components (c) are solutions of polyacrylic acid or else copolymers of acrylic acid and acrylamide, where the corresponding molecular weight may vary from 0.5 to 6 million. The copolymers advantageously have a molar ratio of acrylic acid:acrylamide of from 1:0.8 to 1:1.2. Component (c) can also be a partially hydrolysed polymaleic anhydride. This is generally partially present in the form of a watersoluble salt and has a molecular weight which is preferably between 300 and 5000.

Further thickening agents (c) are polysaccharides, for example carboxymethylcellulose, methylcellulose, methylhydroxyethylcellulose, locust bean flour ether, starch ether, alginates, polyethylene glycols, polyvinylpyrrolidones, polyvinyl alcohols or else finely divided silica, preferably with a specific surface area of 50 to 380 m$^2$/g, and phyllosilicates, for example bentonites, bentones, smectites and montmorillonites. It is also possible to use anionic heteropolysaccharides formed from the monosaccharides glucose and mannose and glucuronic acid.

The amounts of component (c) additives are in general from 0.05 to 8% by weight, preferably 0.1 to 4% by weight, based on the total aqueous dispersion.

As well as components (a) and (b) or (a), (b) and (c), the dispersion according to the invention preferably contains nonionic surfactants or advantageously further anionic compounds other than component (b). Equally, the aqueous dispersion according to the invention may additionally contain antifoams, preservatives or antifreezes.

The nonionic surfactant is advantageously a nonionic alkylene oxide addition product of 1 to 100 mol of alkylene oxide, for example ethylene oxide and/or propylene oxide, with 1 mol of an aliphatic monoalcohol of at least 4 carbon atoms, a 3- to 6-hydric aliphatic alcohol, an unsubstituted or alkyl-, phenyl-, α-tolylethyl-, benzyl-, α-methylbenzyl or α,α-dimethylbenzyl-substituted phenol, or a fatty acid of 8 to 22 carbon atoms.

As nonionic surfactants there may be mentioned for example:

fatty alcohols of 8 to 22 carbon atoms, in particular cetyl alcohol;

polyadducts of preferably 2 to 80 mol of alkylene oxide, in particular ethylene oxide, in which adducts individual ethylene oxide units may be replaced by substituted epoxides, such as styrene oxide and/or propylene oxide, with higher unsaturated or saturated monoalcohols, fatty acids, fatty amines or fatty amides of 8 to 22 carbon atoms or with benzyl alcohols, phenylphenols, benzylphenols, β-phenethylphenols, α-methylbenzylphenols, α,α-dimethylbenzylphenols, α-tolylethylphenols or alkylphenols whose alkyl moieties contain at least 4 carbon atoms;

alkylene oxide, in particular ethylene oxide and/or propylene oxide condensation products (block polymers);

ethylene oxide/propylene oxide polyadducts on diamines, in particular ethylenediamine;

reaction products of a fatty acid of 8 to 22 carbon atoms and a primary or secondary amine having at least one hydroxy(lower alkyl) or (lower alkoxy)(lower alkyl) group, or alkylene oxide addition products of these hydroxyalkyl-containing reaction products, the reaction taking place in such a way that the molecular mixing ratio between hydroxyalkylamine and fatty acid can be 1:1 or greater than 1, for example 1:1 to 2:1;

sorbitan esters, preferably with long-chain ester groups, or ethoxylated sorbitan esters, for example polyoxyethylene sorbitan monolaurate containing 4 to 10 ethylene oxide units or polyoxyethylene sorbitan trioleate containing 4 to 20 ethylene oxide units;

polyadducts of propylene oxide with a tri- to hexahydric aliphatic alcohol of 3 to 6 carbon atoms, for example glycerol or pentaerythritol, the polypropyleneoxy adducts having an average molecular weight of 250 to 1800, preferably 400 to 900; and fatty alcohol polyglycol coethers, in particular polyadducts of 3 to 30 mol of ethylene oxide and 3 to 30 mol of propylene oxide with aliphatic monoalcohols of 8 to 22 carbon atoms, preferably alkanols of 8 to 16 carbon atoms.

Of these, the abovementioned polyadducts of formula (5) derived from styrene addition products are particularly preferred for use as nonionic surfactants.

Additional anionic compounds other than component (b) are for example sulfated unsaturated fatty acids or fatty acid lower alkyl esters having 8 to 20 carbon atoms in the fatty radical, e.g. ricinoleic acid, and oils containing such fatty acids, e.g. castor oil;

alkylarylsulfonates having 1 or 2 linear or branched alkyl chains of at least 6 carbon atoms in total, e.g. dodecylbenzenesulfonates, dibutylnaphthalenesulfonates or 3,7-diisobutylnaphthylsulfonates;

sulfonated 1-benzyl-2-alkylbenzimidazoles having 8 to 22 carbon atoms in the alkyl radical;

sulfonates of polycarboxylic esters, e.g. dihexyl sulfosuccinates, di-2-ethylhexylsulfosuccinates, dioctylsulfosuccinates or sulfosuccinamides;

polyadducts of 1 to 60, preferably 2 to 30, mol of ethylene oxide and/or propylene oxide with fatty amines, fatty amides, fatty acids or fatty alcohols each of 8 to 22 carbon atoms or with tri- to hexahydric alkanols of 3 to 6 carbon atoms converted with an organic dicarboxylic acid, for example maleic acid, malonic acid or sulfosuccinic acid, but preferably with an inorganic polybasic acid, for example orthophosphoric acid or in particular sulfuric acid, into an acid ester; and ligninsulfonates, condensation products of ditolyl ether sulfonates and formaldehyde, condensation products of naphthalenesulfonic acid and/or napthol- or naphthylaminesulfonic acids with formaldehyde, condensation products of phenolsulfonic acids and/or sulfonated dihydroxydiphenyl sulfone and phenols or cresols with formaldehyde and/or urea.

The acid radical of these anionic compounds is in general present in salt form, i.e. as alkali metal, ammonium or amine salt. Examples of such salts are lithium, sodium, potassium, ammonium, trimethylamine, ethanolamine, diethanolamine and triethanolamine salts.

The dispersions according to the invention can contain as antifoams silicone oils and defoamers based on tributyl phosphate or 2-ethylhexanol.

Preferred antifoams are alkylenediamides. These conform advantageously to the formula $$V_1-CO-NH-Q-NH-CO-V_2 \qquad (6)$$

where $V_1$ and $V_2$, independently of one another, are each an aliphatic radical of 9 to 23 carbon atoms and Q is an alkylene radical of 1 to 8, preferably 1, 2 or 3, carbon atoms.

The alkylene diamide can be present as an individual compound or in the form of a mixture.

The aliphatic radicals $V_1$ and $V_2$ can be straight-chain or branched. Together with the CO group they are advantageously the acid radical of an unsaturated or preferably saturated aliphatic carboxylic acid of 10 to 24 carbon atoms. Examples of aliphatic carboxylic acids are capric, lauric, coconut fat, myristic, palm kernel fat, palmitic, tallow fat, oleic, ricinoleic, linoleic, linolenic, stearic, arachic, arachidonic, behenic, erucic and lignoceric acids. Behenic acid and in particular stearic acid are preferred.

It is also possible to use mixtures of these acids as isolated in the splitting of natural oils or fats. Coconut fat acid, palm kernel fat acid, palmitic/stearic acid mixtures, tallow fat acid and arachic/behenic acid mixtures are particularly preferred mixtures.

Preferably, $V_1$ and $V_2$ are each an alkyl radical of 9 to 23 carbon atoms, in particular 15 to 21 carbon atoms.

Q is in particular an alkylene group which contains 2 to 5 carbon atoms and can be straight-chain or branched. Examples are —$CH_2CH_2$—,

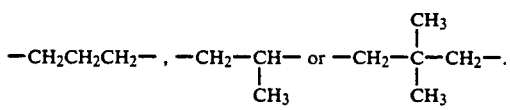

Typical representatives of alkylenediamide antifoams are methylenebis(stearamide), ethylenebis(stearamide) and ethylenebis(behenamide).

The alkylenediamide is preferably present in the dispersion in an amount of 0.2 to 3 per cent by weight.

Suitable preservatives for use in the dispersions according to the invention are a wide range of commercially available products, such as aqueous solutions of formaldehyde, 6-acetoxy-2,4-dimethyldioxane, 1,2-benzisothiazolin-3-one and in particular 2-chloroacetamide.

Antifreezes which can be added to the dispersions according to the invention to preserve the fluency at low temperatures and to prevent the freezing out of water are glycols or polyols, e.g. ethylene glycol, propylene glycol or glycerol, and polyethylene glycols, e.g. di-, tri- or tetraethylene glycol. A preferred antifreeze is propylene glycol.

The aqueous dispersions according to the invention contain with advantage, each percentage based on the entire dispersion 15-50 per cent by weight of component (a),
2-20 per cent by weight of component (b),
0-6, preferably 0.1 to 4, per cent by weight of component (c),
0-20, preferably 5 to 15, per cent by weight of nonionic surfactant,
0-8 per cent by weight of further anionic components other than component (b),
0-3 per cent by weight of antifoam,
0-1 per cent by weight of preservative and
0-20 per cent by weight of antifreeze.

The dispersion according to the invention is advantageously prepared by pasting up the benzotriazole compound of the formula (1), the acid ester of the formula (2) and water in a mixer and, following any addition of the desired additional constituents such as nonionic surfactants, further anionic compounds including the dispersants, antifoams, preservatives and antifreezes, dispersing for 1 to 30, preferably 1 to 10, hours. The dispersing is advantageously effected through the action of high shear forces, for example by grinding in a ball, sand or bead mill. Following grinding, an aqueous solution of the stabilizing or thickening agent (component (c)) and if desired further water can be added and stirred in until uniformly dispersed.

The dispersions according to the invention are notable for good transport and storage stability. They are in particular very stable at elevated temperatures up to 130° C. when used in dyebaths.

The dispersion according to the invention is used depending on the dye in the dyeing of textile material containing synthetic fibres, in particular polyester fibres or even acid-modified polyester fibres. The dyeing method is always carried out in a conventional manner. The dispersion according to the invention is slowly added with stirring to a sharpened aqueous bath, the dye is added, and the liquor is ready for dyeing.

The present invention accordingly also provides a process for dyeing synthetic fibre material with cationic or disperse dyes. The process comprises dyeing this material in the presence of the assistant dispersion according to the invention.

The quantities in which the assistant dispersion according to the invention is added to the dyebath vary from 0.5 to 10%, preferably from 1 to 5%, on weight of fibre.

The fibre material, in particular textile material, which can be dyed in the presence of the novel light stabilizer assistant mixture comprises for example cellulose ester fibres, such as secondary acetate rayon fibres and cellulose acetate fibres, aromatic polyamide fibres derived for example from poly(metaphenyleneisophthalamide), acid-modified polyester fibres in particular linear polyester fibres. Of these, cellulose ester and polyester fibres are preferably dyed with disperse dyes and acid-modified polyester fibres and aromatic polyamide fibres preferably with cationic dyes.

Linear polyester fibres here are to be understood as meaning synthetic fibres obtained for example by condensation of terephthalic acid with ethylene glycol or of isophthalic acid or terephthalic acid with 1,4-bis-(hydroxymethyl)cyclohexane and copolymers of terephthalic and isophthalic acid and ethylene glycol. The linear polyester hitherto used almost exclusively in the textile industry consists of terephthalic acid and ethylene glycol. Acid-modified polyester fibres are for example polycondensation products of terephthalic acid or isophthalic acid, ethylene glycol and sodium 3-(1,3- or 2,3-dihydroxypropoxy)propanesulfonate, sodium (2,3-dimethylolbutoxy)propanesulfonate, disodium isopropylidenedibenzeneoxypropylsulfonate or 3,5-dicarboxybenzenesulfonic acid, sulfonated terephthalic acid, sulfonated 4-methoxybenzenecarboxylic acid or sulfonated biphenyl-4,4'-dicarboxylic acid.

The fiber materials can also be used as blend fabrics with one another or with other fibres, for example mixtures of polyacrylonitrile/polyester, polyamide/polyester, polyester/cotton, polyester/viscose and polyester/wool.

The textile material to be dyed can be at various stages of processing. Possibilities are for example: loose material, piecegoods such as woven or knitted fabrics, yarn in cheese or muff form. The latter can have package densities of 200 to 600 g/dm³, in particular 400 to 450 g/dm³.

The cationic dyes suitable for the process according to the invention can belong to various classes of dyes. They are in particular the customary salts, for example chlorides, sulfates or metal halides, e.g. zinc chloride double salts, of cationic dyes whose cationic character is due for example to a carbonium, oxonium, sulfonium or a particular ammonium group. Examples of such chromophoric systems are azo dyes, in particular monoazo or hydrazone dyes, diphenylmethane, triphenylmethane, methine or azomethine dyes, coumarin, ketone-imine, cyanine, azine, xanthene, oxazine or thiazine dyes. Finally, it is also possible to use dye salts of the phthalocyanine or anthraquinone series with an external onium group, for example an alkylammonium or cycloammonium group, and also benzo-1,2-pyran dye salts that contain cycloammonium groups.

The disperse dyes to be used, which are all but insoluble in water and are mostly present in the dyeing liquor in the form of a fine dispersion, can belong to a wide range of dye classes, for example the acridone, azo, anthraquinone, coumarin, methine, perinone, naphthoquinone-imine, quinophthalone, styryl or nitro dyes.

It is also possible according to the invention to use mixtures of cationic or disperse dyes.

The amount of dye to be added to the liquor depends on the desired depth of shade; suitable amounts range in general from 0.01 to 10, preferably 0.02 to 5, per cent by weight on weight of fibre.

The assistants to be used according to the invention can also be used in admixture with known diffusion accelerants, based for example on di- or trichlorobenzene, methylbenzene, ethylbenzene, o-phenylphenol, benzylphenol, diphenyl ether, chlorobiphenyl, methylbiphenyl, cyclohexanone, acetophenone, alkylphenoxyethanol, mono-, di- or trichlorophenoxy-ethanol or -propanol, pentachlorophenoxyethanol, alkylphenyl benzoates or in particular based on biphenyl, methyl biphenyl ether, dibenzyl ether, methyl benzoate, butyl benzoate or phenyl benzoate.

The diffusion accelerants are preferably used in an amount of 0.5 g to 5 g/l of liquor or 5 to 30 per cent by weight, based on the assistant dispersion.

Depending on the textile material to be treated, the dyebaths may contain oligomer inhibitors, antifoams, crease-resist agents, retarders and preferably dispersants, as well as dyes and the assistant mixture according to the invention.

The dispersants are used in particular to keep the disperse dyes in a state of fine division. Possibilities are the dispersants generally customary in the dyeing with disperse dyes.

Suitable dispersants are preferably sulfated or phosphated addition products of 15 to 100 mol of ethylene oxide or preferably propylene oxide on polyhydric aliphatic alcohols of 2 to 6 carbon atoms, for example ethylene glycol, glycerol or pentaerythritol, or on amines of 2 to 9 carbon atoms having at least two amino groups or an amino group and a hydroxyl group, and also alkylsulfonates of 10 to 20 carbon atoms in the alkyl chain, alkylbenzenesulfonates having a linear or branched alkyl chain of 8 to 20 carbon atoms in the alkyl chain, for example nonylbenzenesulfonate, dodecylbenzenesulfonate, 1,3,5,7-tetramethyloctylbenzenesulfonate or octadecylbenzenesulfonate, and also alkylnaphthalenesulfonates or sulfosuccinic esters, such as sodium dioctyl sulfosuccinate.

Particularly advantageous anionic dispersants are ligninsulfonates, polyphosphates and preferably formaldehyde condensation products from aromatic sulfonic acids, formaldehyde with or without mono- or bifunctional phenols, for example from cresol, β-naphtholsulfonic acid and formaldehyde, from benzenesulfonic acid, formaldehyde and naphthalenesulfonic acid, from naphthalenesulfonic acid and formaldehyde or from naphthalenesulfonic acid, dihydroxydiphenyl sulfone and formaldehyde. Preference is given to the disodium salt of di- or tri(6-sulfo-2-naphthyl)methane.

It is also possible to use mixtures of anionic dispersants. Normally, the anionic dispersants are present in the form of their alkali metal salts, ammonium salts or amine salts. These dispersants are preferably used in an amount of 0.5 to 8 g/l of liquor.

The dyebaths can also contain customary additives, advantageously electrolytes such as salts, for example sodium sulfate, ammonium sulfate, sodium phosphate or polyphosphates, ammonium phosphate or polyphosphates, metal chlorides or nitrates such as calcium chloride, magnesium chloride or calcium nitrates, ammonium acetate or sodium acetate and/or acids, for example mineral acids, such as sulfuric acid or phosphoric acid, or organic acids, advantageously lower aliphatic carboxylic acids, such as formic, acetic or oxalic acid. The acids are used in particular to adjust the pH of the liquors to be used according to the invention, the pH being in general from 4 to 6.5, preferably 4.5 to 6.

The dyeings are advantageously carried out from an aqueous liquor by the exhaust method. The liquor ratio can accordingly be chosen within a wide range, for example 1:3 to 1:100, preferably 1:7 to 1:50. The temperature at which the dyeing or brightening takes place is preferably at least 70° C. and in general it is not higher than 140° C. It is preferably within the range from 80° to 135° C.

Linear polyester fibres and cellulose acetate fibres are preferably dyed by the high-temperature method in sealed and advantageously also pressure-resistant machines at temperatures of above 100° C., preferably between 110° and 135° C., and under atmospheric or superatmospheric pressure. Suitable sealed vessels are for example circulation machines such as package or beam dyeing apparatus, winch becks, jet or drum dyeing machines, muff dyeing machines, paddle machines or jiggers.

Secondary acetate rayon fibres are preferably dyed at temperatures of 80°–85° C. The dyeing of aromatic polyamide fibres or acid-modified polyesters is preferably carried out at a temperature of 80° to 130° C.

The dyeing process can be carried out either by treating the material to be dyed first with the assistant mixture for a short time and then dyeing, or preferably by treating the material to be dyed simultaneously with the assistant mixture and the dye.

Preferably, the bath which contains the dye, the assistant mixture and any further additives and has been adjusted to pH 4.5–5.5 is circulated at 60°–80° C. through the fibre material for 5 minutes, the temperature is then raised to 110°–135° C., preferably 125°–130° C., in the course of 15–35 minutes, and the dyeing liquor is left at that temperature for 15 to 90 minutes, preferably 30 to 60 minutes.

The dyeings are finished by cooling the dyeing liquor down to 60°–80° C., rinsing the dyeing with water and, if necessary, reduction clearing it in a conventional manner in an alkaline medium. The dyeing is then rinsed again and dried. This produces on synthetic fibre material, in particular on linear polyester fibres, deep and level dyeings which, furthermore, are notable for good light fastness and rub fastnesses. During the dyeing, the dyeing liquor remains stable, and there are no deposits on the insides of dyeing machines.

In the Examples, the parts and percentages are by weight.

EXAMPLE 1

In a sand mill, 35 parts of 2-(2'-hydroxy-3'-tert-butyl-5'-methylphenyl)-5-chlorobenzotriazole, 11.2 parts of the triethanolamine salt of the reaction product of phosphorus pentoxide and the polyadduct of 18 mol of ethylene oxide which the adduct of 2.5 to 3 mol of styrene and 1 mol of phenol and 53.8 parts of water are mixed.

The mixture is then ground with quartz sand until the particle size is <5 μm.

71.4 parts of the dispersion obtained are homogenized with 15.0 parts of a 2% aqueous solution of triethanolamine-neutralized polyacrylic acid (molecular weight 1.25 million), 1 part of a deaerant- and solvent-containing antifoam based on 2-ethylhexanol and silicone oil and 12.6 parts of water by stirring. A storable dispersion is obtained.

EXAMPLE 2

In a sand mill, 35 parts of 2-(2'-hydroxy-3'-tert-butyl-5'-methylphenyl)-5-chlorobenzotriazole, 7 parts of the triethanolamine salt of the mono- and diphosphate ester of the polyadduct of 18 mol of ethylene oxide and the adduct of 2.5 to 3 mol of styrene and 1 mol of phenol, 7 parts of a polyadduct of 18 mol of ethylene oxide with 1 mol of an adduct of 2.5 to 3 mol of styrene and 1 mol of phenol 51 parts of water are mixed.

The mixture is then ground until the particle size is <5 pm.

71.4 parts of the dispersion obtained are homogenized with 25.0 parts of a 2% aqueous solution of a biopolymer based on polysaccharide, 1 part of a deaerant- and solvent-containing antifoam based on 2-ethylhexanol and silicone oil and 2.6 parts of water by stirring. A storable dispersion is obtained.

EXAMPLE 3

In a sand mill, 35 parts of 2-(2'-hydroxy-3'-tert-butyl-5'-methylphenyl)-5-chlorobenzotriazole, 11.2 parts of the sodium salt of the sulfated polyadduct of 18 mol of ethylene oxide with 1 mol of the adduct of 2.5 to 3 mol of styrene and 1 mol of phenol, 0.3 part of 2-chloroacetamide and 53.5 parts of water are mixed.

The mixture is ground until the particle size is <5 μm.

71.4 parts of the dispersion obtained are homogenized with 15 parts of a 2% aqueous solution of triethanolamine-neutralized polyacrylic acid (molecular weight 1.25 million), 1 part of a deaerant- and solvent-containing antifoam based on 2-ethylhexanol and silicone oil and 12.6 parts of water by stirring. A storable dispersion is obtained.

EXAMPLE 4

In a sand mill, 35 parts of 2-(2'-hydroxy-3'-tert-butyl-5'-methylphenyl)-5-chlorobenzotriazole, 11.2 parts of the sodium salt of the reaction product of phosphorus pentoxide and the polyadduct of 10 mol of ethylene oxide with 1 mol of p-nonylphenol, and 0.3 parts of 2-chloroacetamide and 53.5 parts of water are mixed.

The mixture is ground until the particle size is <5 μm.

71.4 parts of the dispersion obtained are homogenized with 25 parts of a 2% aqueous solution of a biopolymer based on polysaccharide, 1 part of a deaerant- and solvent-containing antifoam based on 2-ethylhexanol and silicone oil and 2.6 parts of water by stirring. A storable dispersion is obtained.

EXAMPLE 5

In a sand mill, 40 parts of 2-(2'-hydroxy-3'-tert-butyl-5'-methylphenyl)-5-chlorobenzotriazole, 13.4 parts of the triethanolamine salt of the reaction product of phosphorus pentoxide and the polyadduct of 18 mol of ethylene oxide which the adduct of 2.5 to 3 mol of styrene and 1 mol of phenol and 1.4 parts of N,N'-ethylenebis-(stearamide) and 45.2 parts of water are mixed.

The mixture is then ground with quartz sand until the particle size is <5 μm. The dispersion is separated from the grinding sand.

75 parts of the dispersion obtained are homogenized with 12.5 parts of a 2% aqueous solution of a biopolymer based on polysaccharide and 12.5 parts of water by stirring.

A storable slightly viscous dispersion is obtained.

EXAMPLE 6

In a sand mill, 40 parts of 2-(2'-hydroxy-3'-tert-butyl-5'-methylphenyl)-5-chlorobenzotriazole, 13.4 parts of a mixture of 50 parts of the polyadduct of 18 mol of ethylene oxide with 1 mol of tri-(α-methylbenzyl)-phenol and 30 parts of a mixture of mono- and diphosphote esters of the polyadduct of 18 mol of ethylene oxide with 1 mol of tri-(α-methylbenzyl)phenol, which mixture of esters has been neutralized with 20 parts of triethanolamine, 1.4 parts of N,N'-ethylenebis-(stearamide) and 45.2 parts of water are mixed.

The mixture is then ground with quartz sand until the particle size is <5 μm. The dispersion is separated from the grinding sand.

75 parts of the dispersion obtained are homogenized with 12.5 parts of 2% aqueous solution of a biopolymer based on polysaccharide and 12.5 parts of water by stirring.

A storable slightly viscous dispersion is obtained.

EXAMPLE 7

In a sand mill, 40 parts of 2-(2'-hydroxy-3'-tert-butyl-5'-methylphenyl)-5-chlorobenzotriazole, 13.4 parts of a mixture of 60 parts of the polyadduct of 18 mol of ethylene oxide with 1 mol of tri-(α-methylbenzyl)phenol and 35 parts of a mixture of mono- and diphosphate esters of the polyadduct of 18 mol of ethylene oxide with 1 mol of tri-(α-methylbenzyl)phenol, which mixture of esters has been neutralized with 5 parts of potassium hydroxide, 1.4 parts of N,N'-ethylenebis-(stearamide) and 45.2 parts of water are mixed.

The mixture is then ground with quartz sand until the particle size is <5 μm. The dispersion is separated from the grinding sand.

75 parts of the dispersion obtained are homogenized with 12.5 parts of a 2% aqueous solution of a biopolymer based on polysaccharides and 12.5 parts of water by stirring.

A storable slightly viscous dispersion is obtained.

EXAMPLE 8

In a sand mill, 40 parts of 2-(2'-hydroxy-3'-tert-butyl-5'-methylphenyl)-5-chlorobenzotriazole, 11 parts of a mixture of 15 parts of the polyadduct of 10 mol of ethylene oxide with 1 mol of p-nonylphenol, 85 parts of the sodium salt of a mixture of mono- and diphosphate esters of the polyadduct of 10 mol of ethylene oxide with 1 mol of p-nonylphenol, 4 parts of N,N'-ethylenebis-(stearamide) and 45 parts of water are mixed.

The mixture is then ground with quartz sand until the particle size is <5 μm. The dispersion is separated from the grinding sand.

75 parts of the dispersion obtained are homogenized with 12.5 parts of a 2% aqueous solution of a biopolymer based on polysaccharide and 12.5 parts of water by stirring.

A storable slightly viscous dispersion is obtained.

EXAMPLE 9

In a sand mill, 40 parts of 2-(2'-hydroxy-3'-tert-butyl-5'-methylphenyl)-5-chlorobenzotriazole, 8 parts of the sodium salt of the maleate of the polyadduct of 18 mol of ethylene oxide with the adduct of 3 mol of styrene and 1 mol of phenol, 1 part of N,N'-ethylenebis-(stearamide) and 51 parts of water are mixed.

The mixture is then ground with quartz sand until the particle size is <5 μm. The dispersion is separated from the grinding sand.

75 parts of the dispersion obtained are homogenized with 12.5 parts of a 2% aqueous solution of a biopolymer based on polysaccharide, 0.3 part of chloroacetamide and 12.2 parts of water by stirring.

A storable dispersion is obtained.

EXAMPLE 10

In a sand mill, 35 parts of 2-(2'-hydroxy-3'-tert-butyl-5'-methylphenyl)-5-chlorobenzotriazole, 11.7 parts of the sodium salt of the reaction product of phosphorus pentoxide and the polyadduct of 13 mol of ethylene oxide with the adduct of 2 to 3 mol of styrene and 1 mol of phenol and 53.3 parts of water are mixed.

The mixture is then ground with quartz sand until the particle size is <5 μm.

71.4 parts of the dispersion obtained are homogenized with 25 parts of a 2% aqueous solution of a biopolymer based on polysaccharide, 1 part of a deaerant- and solvent-containing antifoam based on 2-ethylhexanol and silicone oil and 2.6 parts of water by stirring. A storable dispersion is obtained.

EXAMPLE 11

In a sand mill, 40 parts of 2-(2'-hydroxy-3'-tert-butyl-5'-methylphenyl)-5-chlorobenzotriazole, 16 parts of a mixture of 3 parts of the polyadduct of 10 mol of ethylene oxide with 1 mol of dinonylphenol, 13 parts of the sodium salt of a mixture of mono- and diphosphate esters of the polyadduct of 10 mol of ethylene oxide with 1 mol of dinonylphenol 4 parts of N,N'-ethylenebis-(stearamide) and 40 parts of water are mixed.

The mixture is then ground with quartz sand until the particle size is <5 μm. The dispersion is separated from the grinding sand.

75 parts of the dispersion obtained are homogenized with 12.5 parts of a 2% aqueous solution of a biopolymer based on polysaccharide and 12.5 parts of water by stirring.

A storable slightly viscous dispersion is obtained.

EXAMPLE 12

100 g of a knitted polyester (polyethylene glycol terephthalate) fabric are introduced in an HT circulation apparatus at 60° C. in 3 liters of water containing 9 g of ammonium sulfate 18 g of the disodium salt of di-(6-sulfo-2-naphthyl)methane 5 g of a finely dispersed dye of the formula

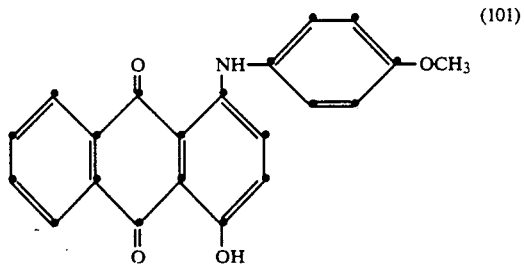

(101)

3 g of the assistant formulation prepared as described in Example 5 and has been adjusted to pH 5 with 85% of formic acid. The dyebath is heated with constant liquor circulation to 130° C. in the course of 30 minutes and dyeing is carried out at this temperature for 1 hour. The dyebath is then cooled down, and the substrate is rinsed and as usual reduction cleared to remove unfixed dye. The substrate is then neutralized, rinsed once more and dried. Owing to the stable assistant formulation used, the differential pressure does not increase during the dyeing process, nor are there any deposits on the inside of the wound package. A level light-fast navy dyeing is thus obtained.

Level light-fast navy dyeings are also obtained on replacing the assistant formulation as described in Example 5 by the assistant formulations prepared as described in Example 1, 2, 3, 4, 6, 7, 8, 9, 10 or 11.

EXAMPLE 13

100 g of Dacron 64 fabric (acid-modified polyester) are put into a high-temperature dyeing machine containing 2 liters of an aqueous liquor containing 2 g of an amphoteric sulfated fatty amine polyethylene glycol ether,
12 g of calcined sodium sulfate,
1.5 g of a dye salt of the formula

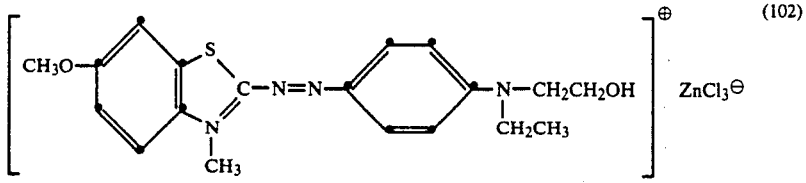

and 3 g of the aqueous assistant dispersion prepared as described in

Example 2 which liquor has been adjusted to pH 4.5 with acetic acid. The dyebath is heated to 120° C. in the course of 30 minutes and dyeing is carried out at that temperature for 1 hour. The dyebath is then cooled down to 70° C., and the substrate is neutralized, rinsed and dried in the usual manner.

The dyeing liquor gives no precipitations or deposits during dyeing. A level and light-fast red dyeing is thus obtained.

Level light-fast red dyeings are also obtained on replacing the assistant formulation described in Example 2 by the assistant formulation prepared as described in Example 1, 3, 4, 5, 6, 7, 8, 9, 10 or 11.

What is claimed is:

1. An aqueous dispersion of a 2-(2'-hydroxyphenyl)-benzotriazole compound, comprising
   (a) 15 to 50 per cent by weight of a benzotriazole compound of the formula

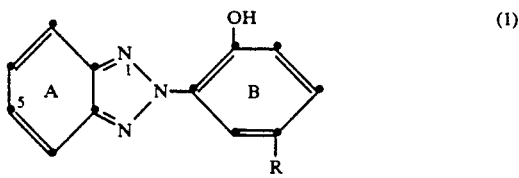

where R is halogen, $C_1-C_{12}$alkyl, lower alkoxy, lower alkoxycarbonyl, cycloalkyl, aryl, $C_1-C_{12}$alkylaryl or aralkyl, and the rings A and B are independently of one another unsubstituted or substituted by halogen, hydroxyl, lower alkyl, lower alkoxy or lower alkoxycarbonyl, and
   (b) 2 to 20 per cent by weight of an acid ester, or a salt thereof, of an alkylene oxide adduct of the formula

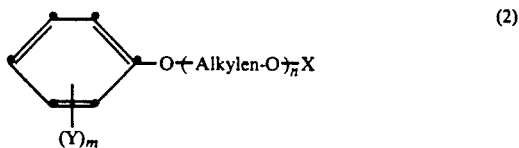

where X is the acid radical of an inorganic oxygen-containing acid, or the radical of an organic acid and Y is $C_1-C_{12}$alkyl, aryl or aralkyl, "Alkylen" is the ethylene radical or propylene radical, m is from 1 to 4 and n from 4 to 50.

2. A dispersion according to claim 1, wherein in the formula (1) the ring A is substituted in the 5-position by halogen, lower alkyl or lower alkoxy.

3. A dispersion according to claim 1, wherein in the formula (1) the ring B is substituted by halogen or lower alkyl adjacent to the hydroxyl group.

4. A dispersion according to claim 1, wherein in the formula (1) R is lower alkyl.

5. A dispersion according to claim 1, wherein in the formula (2) Y is $C_4-C_{12}$alkyl, benzyl or α-methylbenzyl.

6. A dispersion according to claim 1, wherein the acid radical X in the formula (2) is derived from sulfuric acid or orthophosphoric acid.

7. A dispersion according to claim 1, wherein component (a) conforms to the formula

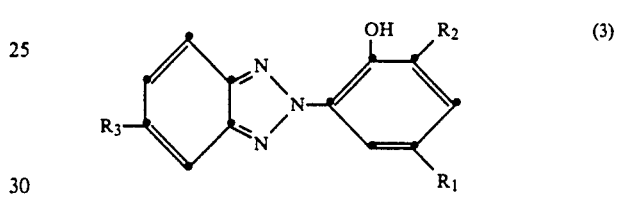

where $R_1$ is halogen, lower alkyl or lower alkoxy, and $R_2$ and $R_3$ are each independently of the other hydrogen, halogen, lower alkyl or lower alkoxy.

8. A dispersion according to claim 7, wherein in the formula (3) $R_1$ is lower alkyl, $R_2$ is hydrogen or lower alkyl and $R_3$ is hydrogen, chlorine or methyl.

9. A dispersion according to claim 1, wherein component (b) conforms to the formula

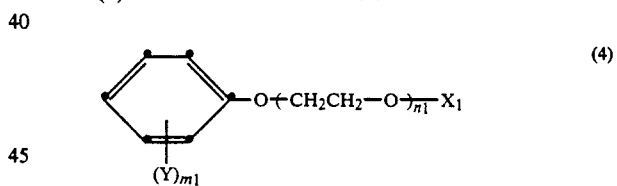

where $Y_1$ is $C_4-C_{12}$alkyl, phenyl, tolyl, phenyl-$C_1-C_3$alkyl or tolyl-$C_1-C_3$-alkyl, $X_1$ is an acid radical derived from sulfuric acid or orthophosphoric acid, $m_1$ is from 1 to 3 and $n_1$ is from 4 to 40.

10. A dispersion according to claim 1, wherein component (b) is an acid phosphoric ester, or a salt thereof, of the polyadduct of 8 to 30 mol of ethylene oxide with 1 mol of p-nonylphenol or dinonylphenol or with the adduct of 1 to 3 mol of styrene, α-methylstyrene or vinyltoluene with 1 mol of phenol, cresol or xylenol.

11. A dispersion according to claim 1, wherein component (b) is an acid phosphoric ester, or a salt thereof, of the polyadduct of the formula

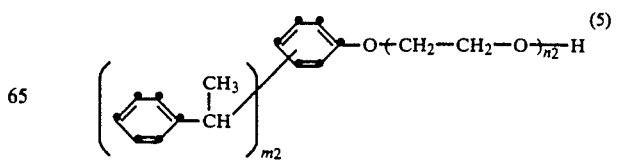

where $m_2$ is from 1 to 3 and $n_2$ is from 12 to 30.

12. A dispersion according to claim 1, wherein component (b) is the triethanolamine, potassium or sodium salt of a mixture of monoester and diester phosphates of the polyadduct of 12 to 18 mol of ethylene oxide with the adduct of 1 to 3 mol of styrene with 1 mol of phenol.

13. A dispersion according to claim 1, which additionally comprises as third component (c) an effective amount of a stabilizing or thickening agent.

14. A dispersion according to claim 13, wherein component (c) is a 0.5 to 10% aqueous solution or dispersion of a polymerized ethylenically unsaturated mono- or dicarboxylic acid of 3 to 5 carbon atoms.

15. A dispersion as claimed in claim 13, wherein component (c) is a polysaccharide.

16. A dispersion according to claim 1, which additionally comprises as an effective amount of a nonionic surfactant.

17. A dispersion according to claim 16, wherein the nonionic surfactant is a polyadduct of the formula

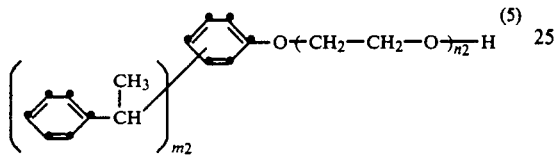

(5)

where $m_2$ is from 1 to 3 and $n_2$ is from 12 to 30.

18. A dispersion according to claim 16, wherein the nonionic surfactant is the polyadduct of 12 to 20 mol of ethylene oxide with the adduct of 1 to 3 mol of styrene with 1 mol of phenol.

19. A dispersion according to claim 1, which additionally contains a further anionic compound other than component (b).

20. A dispersion according to claim 1, which additionally comprises an effective amount of an antifoam.

21. A dispersion according to claim 20, wherein the antifoam is an alkylenediamide of the formula $$V_1-CO-NH-Q-NH-CO-V_2 \qquad (6)$$

where $V_1$ and $V_2$ are each independently of the other an aliphatic radical of 9 to 23 carbon atoms and Q is an alkylene radical of 1 to 8 carbon atoms.

22. A dispersion according to claim 1, which additionally comprises an effective amount of a preservative.

23. A dispersion according to claim 1, which additionally comprises an effective amount of an antifreeze.

24. A dispersion according to claim 1, which comprises, based on the entire dispersion,
   15-50 per cent by weight of component (a),
   2-20 percent by weight of component (b),
   0-5 per cent by weight of a stabilizing or thickening agent,
   0-20 per cent by weight of a nonionic surfactant,
   0-8 per cent by weight of a further anionic compound other than compound (b),
   0-3 per cent by weight of an antifoam,
   0-1 per cent by weight of a preservative and
   0-20 per cent by weight of an antifreeze
   whereby at least an effective amount of two of the above stabilizing or thickening agent, nonionic surfactant, further anionic compound other than compound (b), antifoam, preservative or antifreeze must be present.

25. A process for dyeing textile material containing polyester fibres with disperse dyes, or acid-modified polyester fibres with cationic dyes, which process comprises dyeing this material in the presence of an aqueous dispersion of a 2-(2'-hydroxyphenyl)benzotriazole compound according to claim 1.

* * * * *